United States Patent
Fu et al.

(10) Patent No.: US 11,754,140 B2
(45) Date of Patent: Sep. 12, 2023

(54) COUPLING BEAM EDDY CURRENT DAMPER WITH SHEAR DISPLACEMENT AMPLIFICATION

(71) Applicant: DALIAN UNIVERSITY OF TECHNOLOGY, Liaoning (CN)

(72) Inventors: Xing Fu, Liaoning (CN); Hongnan Li, Liaoning (CN); Gang Li, Liaoning (CN); Xingheng Zhang, Liaoning (CN); Zhiqian Dong, Liaoning (CN); Wenlong Du, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 663 days.

(21) Appl. No.: 16/967,695

(22) PCT Filed: Sep. 20, 2019

(86) PCT No.: PCT/CN2019/106889
§ 371 (c)(1),
(2) Date: Aug. 5, 2020

(87) PCT Pub. No.: WO2021/051374
PCT Pub. Date: Mar. 25, 2021

(65) Prior Publication Data
US 2021/0148434 A1 May 20, 2021

(51) Int. Cl.
*E04H 9/02* (2006.01)
*F16F 15/03* (2006.01)

(52) U.S. Cl.
CPC ........ *F16F 15/035* (2013.01); *E04H 9/0237* (2020.05); *F16F 2222/06* (2013.01); *F16F 2236/10* (2013.01)

(58) Field of Classification Search
CPC .. F16F 15/035; F16F 2222/06; F16F 2236/10; E04H 9/021; E04H 9/0237
See application file for complete search history.

(56) References Cited

U.S. PATENT DOCUMENTS 7,869,001 B2 * 1/2011 Makarovic .............. G03F 7/709
355/75
11,255,407 B2 * 2/2022 Imanishi ............... F16F 15/035
(Continued)

FOREIGN PATENT DOCUMENTS

CN        206368933 U       8/2017
CN        206529922 U       9/2017
(Continued)

*Primary Examiner* — Thomas W Irvin
(74) *Attorney, Agent, or Firm* — Muncy, Geissler, Olds & Lowe, P.C.

(57) ABSTRACT

The present invention discloses a coupling beam eddy current damper with shear displacement amplification. The coupling beam eddy current damper with shear displacement amplification comprises a rigid rod, rotating shafts, a pin column, pins, levers, screws, thread sleeves, copper sheets, permanent magnet components, a steel structural component, balls, ball supports and an outer shell. When vibration occurs, coupling beams on both sides of the damper are relatively vertically displaced; at this moment, two levers move up and down relative to the rigid rod; the movement causes the screws and the copper sheets to rotate; the copper sheets rotate in a magnetic field, then induced electromotive force will generates inside the magnetic field, thereby generating eddy current in the copper sheets. The eddy current effect will produce a damping force that impedes the rotation of the copper sheets.

2 Claims, 3 Drawing Sheets

(56) References Cited

U.S. PATENT DOCUMENTS

| | | | | |
|---|---|---|---|---|
| 11,293,175 B2* | 4/2022 | Fu | ......................... | E04H 9/0215 |
| 11,293,512 B2* | 4/2022 | Fu | ......................... | E04H 9/0215 |
| 11,466,744 B2* | 10/2022 | Huang | ..................... | F16F 6/00 |
| 2007/0131504 A1* | 6/2007 | Bronowicki | .......... | F16F 15/035 |
| | | | | 188/379 |
| 2008/0106361 A1 | 5/2008 | Makarovic | | |
| 2020/0263759 A1* | 8/2020 | Imanishi | ................. | F16F 6/005 |
| 2020/0362933 A1* | 11/2020 | Fu | ......................... | F16F 7/1011 |
| 2020/0400211 A1* | 12/2020 | Noguchi | ................ | H02K 49/10 |
| 2021/0115999 A1* | 4/2021 | Fu | ......................... | F16F 15/035 |
| 2021/0148114 A1* | 5/2021 | Fu | ............................ | F16F 7/10 |
| 2021/0301896 A1* | 9/2021 | Huang | ................... | E04H 9/021 |
| 2021/0363771 A1* | 11/2021 | Nogami | ................. | E04H 9/021 |

FOREIGN PATENT DOCUMENTS

| | | |
|---|---|---|
| CN | 107355509 A | 11/2017 |
| CN | 108590301 A | 9/2018 |
| CN | 109751352 A | 5/2019 |
| CN | 110528719 A | 12/2019 |
| WO | WO-2011/133044 A1 | 10/2011 |

* cited by examiner

Schematic Diagram of
Coupling Beam

COUPLING BEAM EDDY CURRENT DAMPER WITH SHEAR DISPLACEMENT AMPLIFICATION

TECHNICAL FIELD

The present invention belongs to the technical field of structural vibration control, and particularly relates to a coupling beam eddy current damper with shear displacement amplification.

BACKGROUND

Coupling beam damper is a kind of device that absorbs seismic vibration energy to reduce the damage to buildings, and is widely used in shear wall buildings. When a building is affected by an earthquake, a coupling beam is required to consume the impact energy on the building caused by external forces, and the damper is used to reduce the vibration response of the coupling beam, thereby greatly reducing the shear damage degree of the coupling beam under the earthquake. However, the existing coupling beam damper still has many defects, such as low energy dissipation efficiency at small amplitude, and poor capability of consuming vibration and shock energy. These defects greatly affect the safety of the buildings and the safety of lives and property of people Aiming at the defects in the existing product, the present invention proposes a coupling beam eddy current damper with shear displacement amplification based on energy dissipation by eddy current effect.

SUMMARY

With respect to the problem of poor capability of consuming vibration and shock energy in the prior art, the present invention proposes a coupling beam eddy current damper with shear displacement amplification with high energy dissipation efficiency.

To achieve the above purpose, the present invention adopts the following technical solution:

A coupling beam eddy current damper with shear displacement amplification is provided. The coupling beam eddy current damper with shear displacement amplification comprises a rigid rod 1, rotating shafts 2, a pin column 3, pins 4, levers 5, screws 6, thread sleeves 7, copper sheets 8, permanent magnet components 9, a steel structural component 10, balls 11, ball supports 12 and an outer shell 13. The outer shell 13 is of a hollow rectangular structure with an open end; the steel structural component 10 is of a rectangular structure with a through hole in the middle; four spatial structures for installing the permanent magnet components 9 are constructed through a plurality of steel plates in the steel structural component 10; the steel structural component 10 is inserted into the outer shell 13 with a gap therebetween to allow relative movement; and the steel structural component 10 and the outer shell 13 are respectively installed on two coupling beams.

The section of the rigid rod 1 is rectangular; the rigid rod 1 is installed on an inner wall surface of the outer shell 13 through the through hole of the steel structural component 10; the rigid rod 1 is rigidly connected to the outer shell 13; the long edge direction of the rigid rod 1 is a vertical direction; two levers 5 are arranged; one end part of each lever 5 is provided with a sliding hole A501, and the other end part of each lever 5 is provided with a screw mounting hole 502; the middle of each lever 5 is provided with a sliding hole B503; the pin column 3 penetrates through the sliding hole A501 of each lever 5 to install the two levers 5 on both sides of the rigid rod 1; and two rotating shafts 2 in the steel structural component 10 respectively penetrate through the sliding holes B503 of the two levers 5.

Four ball supports 12 are arranged, and respectively installed on the outer surface of the inner steel plate of the steel structural component 10; two screws 6 are arranged, and vertically installed in the screw mounting holes 502 through the pins 4; both ends of each screw 6 penetrate through the ball supports 12 and the inner steel plate of the steel structural component 10 in sequence; four thread sleeves 7 are arranged, and close ends thereof penetrate through the inner steel plate of the steel structural component 10 and are positioned on the outer shell of the steel structural component 10; the four thread sleeves 7 are respectively installed at the ends of the screws 6 through thread pairs; a plurality of balls 11 are installed at the closed ends and open ends of the thread sleeves 7; the balls 11 at the closed ends are in contact with the inner surface of the outer shell of the steel structural component 10, and the balls 11 at the open ends are limited around the screws 6 by the ball supports 12; the thread sleeves 7 can rotate freely between the steel structural component 10 and the ball supports 12; four copper sheets 8 are arranged, and respectively installed on the outer sides of the thread sleeves 7; the copper sheets 8 are perpendicular to the axes of the thread sleeves 7; four groups of permanent magnet components 9 are arranged, and respectively installed in a space formed by the inner steel plate of the steel structural component 10; each group of permanent magnet component 9 has two permanent magnets which are respectively positioned on both sides of the copper sheets 8; and magnetic induction lines among the permanent magnet components 9 are perpendicular to the copper sheets 8.

Further, the distance between the centers of the screw mounting holes 502 and the centers of the sliding holes B503 is $R_1$, the distance between the centers of the sliding holes A501 and the centers of the sliding holes B503 is $R_2$, and $R_1 > R_2$.

The present invention has the working principle that:

When vibration occurs, the coupling beams on both sides of the damper are relatively vertically displaced; at this moment, the two levers 5 move up and down relative to the rigid rod 1; the movement causes the screws 6 and the copper sheets 8 to rotate; the copper sheets rotate in a magnetic field, then induced electromotive force will generates inside the magnetic field, thereby generating eddy current in the copper sheets. The eddy current effect produces a damping force that impedes the rotation of the copper sheets. Meanwhile, according to the thermal effect of the eddy current that vibration energy is converted into heat energy, thereby reducing structural vibration.

Especially, the levers can amplify the relative vertical displacement on both sides of the coupling beams. The magnification is $R_1/R_2$. The larger the ratio of $R_1$ and $R_2$ is, the more obvious the amplification effect is and the higher the energy dissipation efficiency is. In addition, if the screw pitch is set to d, then the copper sheets rotate once each time the screws generate vertical displacement d; the screw pitch is far shorter than the vertical displacement of the screws, and the small vertical displacement of the screws can cause the copper sheets to rotate at a large angle; an eddy current damping force formed by the rotation of the copper sheets forms a large torque to the rotating shafts; the torque is converted into a large damping force that impedes the vertical movement of the screws through screw pairs; the larger the ratio of the screw displacement and the screw pitch is, the better the amplification effect is; and thus, the damper obtains a large damping coefficient.

The present invention has the following beneficial effects:

(1) In the coupling beam eddy current damper with shear displacement amplification of the present invention, the vertical relative shear displacement of the coupling beams is converted into the rotation of the circular copper sheets to generate the eddy current for energy dissipation; the shear displacement of the coupling beams is amplified by the levers and thread drive; and small shear displacement can cause large angle rotation of the copper sheets, thereby greatly increasing the energy dissipation efficiency.

(2) In the coupling beam eddy current damper with shear displacement amplification of the present invention, the damping parameter can be adjusted by adjusting a lever ratio, the magnetic field strength of the permanent magnets, the thickness of the copper sheets, the radius of the copper sheets, and the distance between the copper sheets and the permanent magnets.

(3) In the coupling beam eddy current damper with shear displacement amplification of the present invention, the permanent magnets are adopted for providing continuous magnetic field sources, and long-term stable vibration reduction effect can be generated without outside energy.

(4) The coupling beam eddy current damper with shear displacement amplification of the present invention adopts magnetic conductive materials, which can effectively avoid magnetic leakage in magnetic circuits, so that the efficiency of eddy current damping is increased, and the influence on various components and parts around is avoided.

(5) The coupling beam eddy current damper with shear displacement amplification of the present invention has reasonable design, simple structure and convenient installation method.

(6) In the present invention, the relative vertical displacement on both sides of the coupling beams can be amplified. The magnification is $R_1/R_2$. The larger the ratio of $R_1$ and $R_2$ is, the more obvious the amplification effect is and the higher the energy dissipation efficiency is.

(7) If the screw pitch of the screws in the present invention is set to d, then the copper sheets will rotate a circle when the screws generate vertical displacement d; the screw pitch is much smaller than the vertical displacement of the screws, and small vertical displacement of the screws can cause the copper sheets to rotate at a large angle; an eddy current damping force formed by the rotation of the copper sheets forms a large torque to the rotating shafts; the torque is converted into a large damping force that impedes the vertical movement of the screws through screw pairs; the larger the ratio of the screw displacement and the screw pitch is, the better the amplification effect is; and thus, the damper obtains a large damping coefficient.

In the figures: 1 rigid rod; 2 rotating shaft; 3 pin column; 4 pin; 5 lever; 6 screw; 7 thread sleeve; 8 copper sheet; 9 permanent magnet component; 10 steel structural component; 11 ball; 12 ball support; 13 outer shell; 501 sliding hole A; 502 installing hole; 503 sliding hole B.

DETAILED DESCRIPTION

Figure 1:
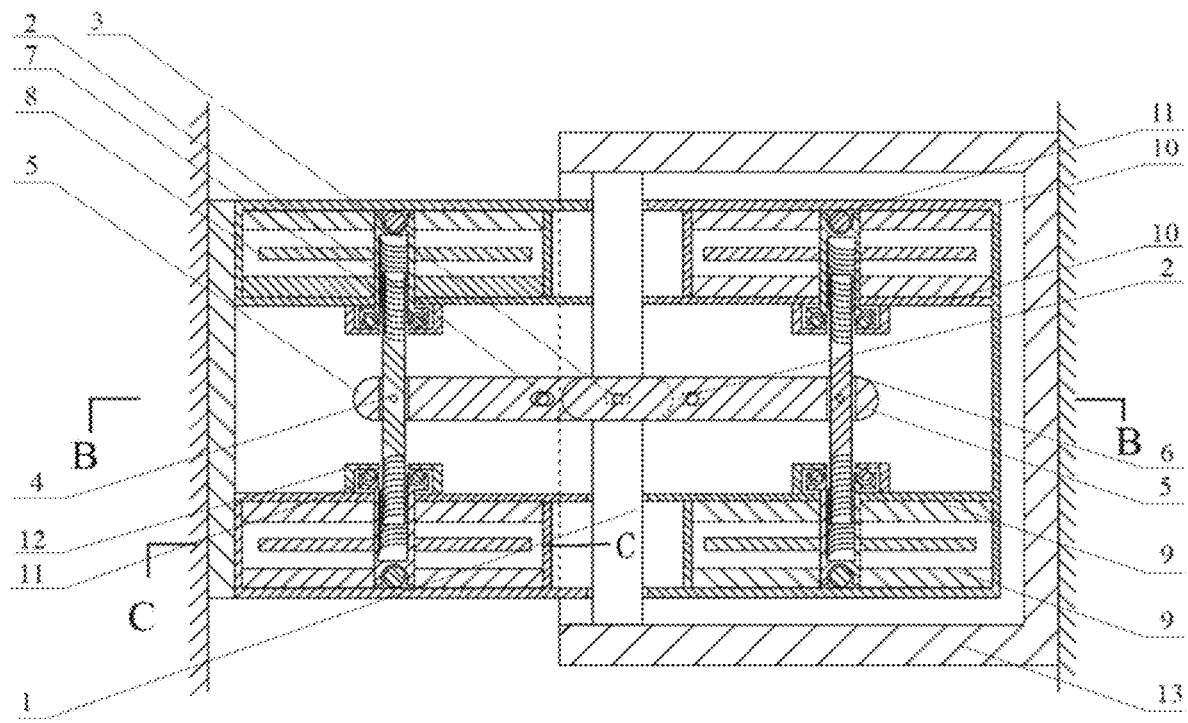
FIG. 1 is an A-A sectional view of a coupling beam eddy current damper with shear displacement amplification in the present invention.
Figure 2:
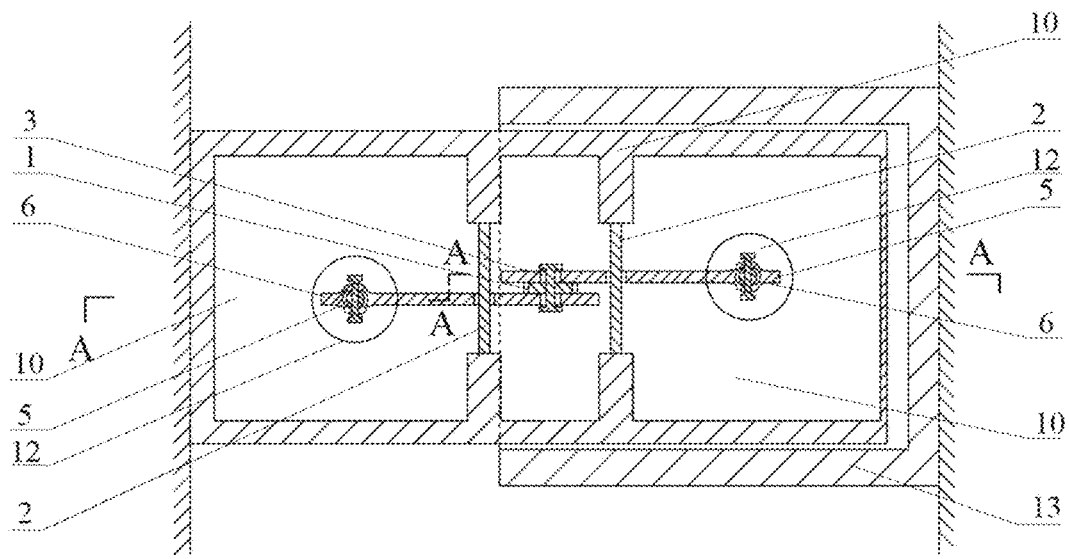
FIG. 2 is a B-B sectional view of a coupling beam eddy current damper with shear displacement amplification in the present invention.
Figure 3:
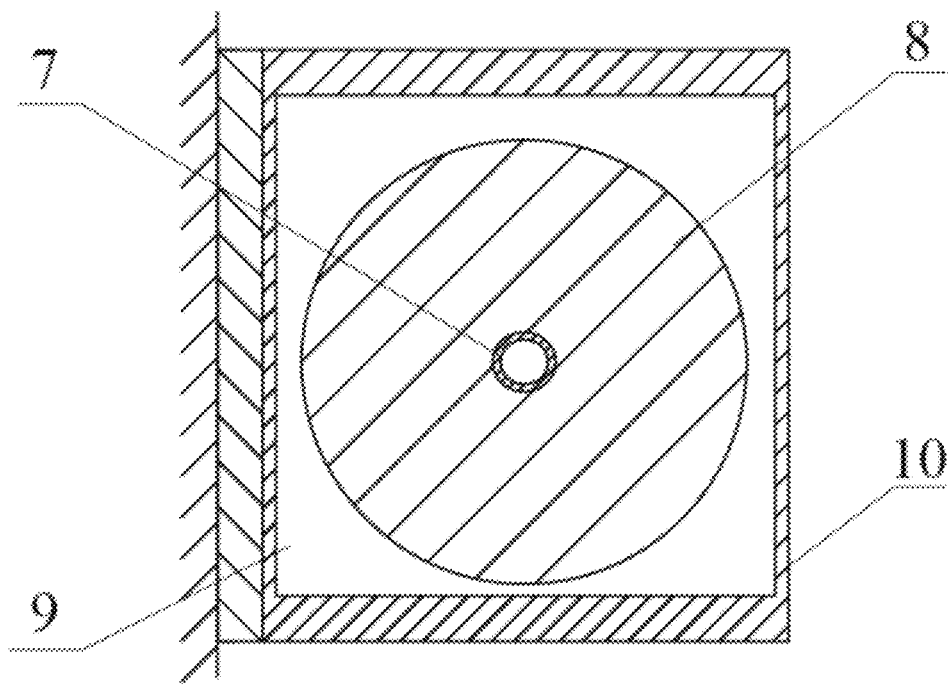
FIG. 3 is a C-C sectional view of a coupling beam eddy current damper with shear displacement amplification in the present invention.
Figure 4:
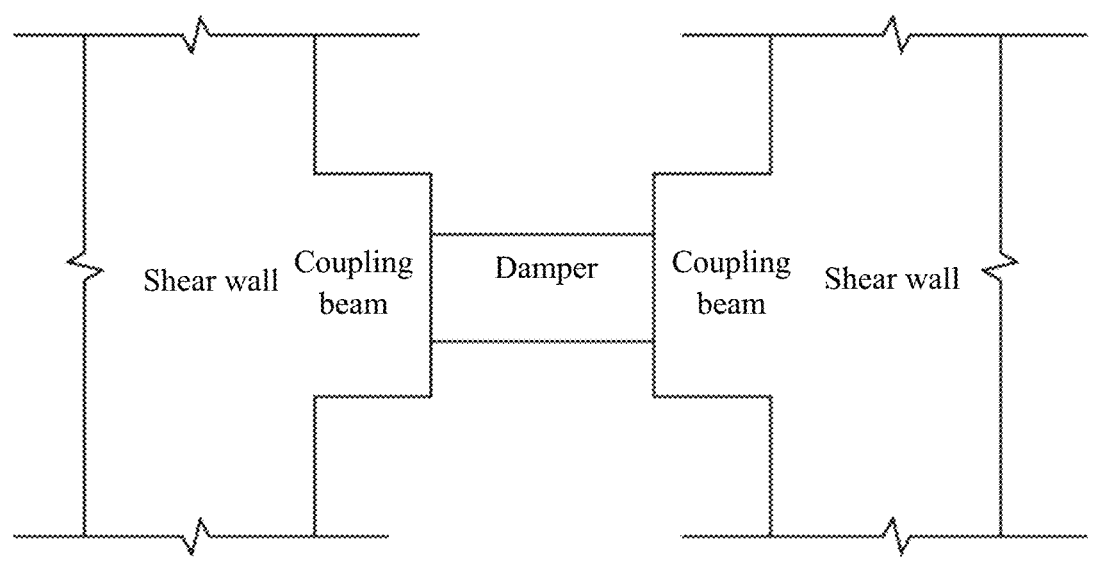
FIG. 4 is a schematic diagram of installation of a coupling beam eddy current damper with shear displacement amplification in the present invention.

In order to make the purpose, features, and advantages of the present invention more obvious and understandable, the present invention is further described below with reference to the drawings and in conjunction with specific embodiments, so that those skilled in the art can implement the present invention with reference to the words of the description. The protection scope of the present invention is not limited to the detailed description. Apparently, the embodiments described below are merely part of the embodiments of the present invention, not all of the embodiments. Based on the embodiments in the present invention, all other embodiments obtained by those ordinary skilled in the art without contributing creative labor will belong to the protection scope of the present invention.

a coupling beam eddy current damper with shear displacement amplification, as shown in FIG. 1, FIG. 2 and FIG. 3, comprises a rigid rod 1, rotating shafts 2, a pin column 3, pins 4, levers 5, screws 6, thread sleeves 7, copper sheets 8, permanent magnet components 9, a steel structural component 10, balls 11, ball supports 12 and an outer shell 13. The outer shell 13 is of a hollow rectangular structure with an open end; the steel structural component 10 is of a rectangular structure with a through hole in the middle; four spatial structures for installing the permanent magnet components 9 are constructed through a plurality of steel plates in the steel structural component 10; the steel structural component 10 is inserted into the outer shell 13 with a gap therebetween to allow relative movement; and the steel structural component 10 and the outer shell 13 are respectively installed on two coupling beams.

The section of the rigid rod 1 is rectangular; the rigid rod 1 is installed on an inner wall surface of the outer shell 13 through the through hole of the steel structural component 10; the rigid rod 1 is rigidly connected to the outer shell 13; the long edge direction of the rigid rod 1 is a vertical direction.

Figure 5:
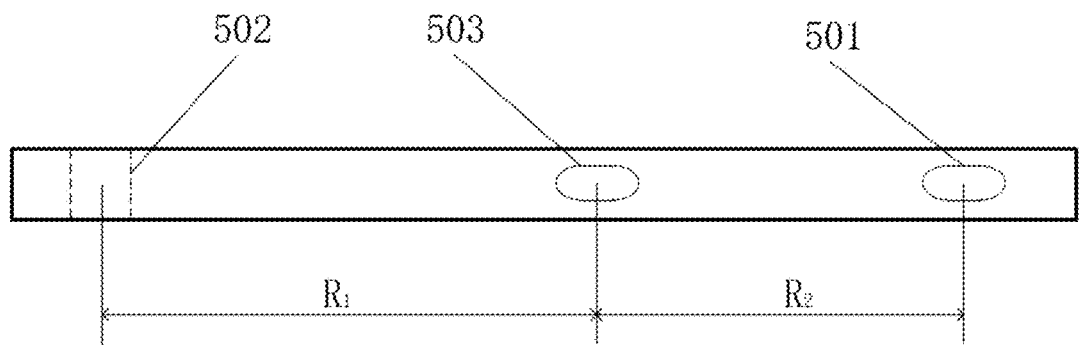
FIG. 5 is a structural schematic diagram of a lever in the present invention.
Figure 6:
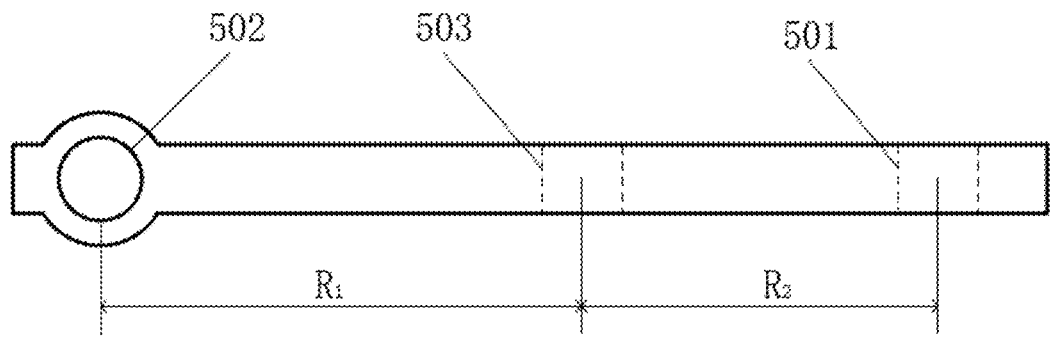
FIG. 6 is a structural schematic diagram of a lever in the present invention.

Two levers 5 as shown in FIG. 5 and FIG. 6 are arranged; one end part of each lever 5 is provided with a sliding hole A501, and the other end part of each lever 5 is provided with a screw mounting hole 502; the middle of each lever 5 is provided with a sliding hole B503; the pin column 3 penetrates through the sliding hole A501 of each lever 5 to install the two levers 5 on both sides of the rigid rod 1; two rotating shafts 2 in the steel structural component 10 respectively penetrate through the sliding holes B503 of the levers 5.

Four ball supports 12 are arranged, and respectively installed on the outer surface of the inner steel plate of the steel structural component 10; two screws 6 are arranged, and vertically installed in the screw mounting holes 502 through the pins 4; both ends of each screw 6 penetrate through the ball supports 12 and the inner steel plate of the steel structural component 10 in sequence; four thread sleeves 7 are arranged, and close ends thereof penetrate through the inner steel plate of the steel structural component 10 and are positioned on the outer shell of the steel structural component 10; the four thread sleeves 7 are respectively installed at the ends of the screws 6 through thread pairs; a plurality of balls 11 are installed at the closed ends and open ends of the thread sleeves 7; the balls 11 at the closed ends are in contact with the inner surface of the outer shell of the steel structural component 10, and the balls 11 at the open ends are limited around the screws 6 by the ball supports 12; the thread sleeves 7 rotate freely between the steel structural component 10 and the ball supports 12; four copper sheets 8 are arranged, and respectively installed on the outer sides of the thread sleeves 7; the copper sheets 8 are perpendicular to the axes of the thread sleeves 7; four groups of permanent magnet components 9 are arranged, and respectively installed in a space formed by the inner steel plate of the steel structural component 10; each group of permanent magnet component 9 has two permanent magnets which are respectively positioned on both sides of the copper sheets 8; and magnetic induction lines among the permanent magnet components 9 are perpendicular to the copper sheets 8.

Further, the distance between the centers of the screw mounting holes 502 and the centers of the sliding holes B503 is $R_1$, the distance between the centers of the sliding holes A501 and the centers of the sliding holes B503 is $R_2$, and $R_1 > R_2$.

The present invention has the working principle that:

When vibration occurs, the coupling beams on both sides of the damper are relatively vertically displaced; at this moment, the two levers 5 move up and down relative to the rigid rod 1; the movement causes the screws 6 and the copper sheets 8 to rotate; the copper sheets rotate in a magnetic field, then induced electromotive force will generates inside the magnetic field, thereby generating eddy current in the copper sheets. The eddy current effect produces a damping force that impedes the rotation of the copper sheets. Meanwhile, according to the thermal effect of the eddy current that vibration energy is converted into heat energy, thereby reducing structural vibration.

Especially, the levers can amplify the relative vertical displacement on both sides of the coupling beams. The magnification is $R_1/R_2$. The larger the ratio of $R_1$ and $R_2$ is, the more obvious the amplification effect is and the higher the energy dissipation efficiency is. In addition, if the screw pitch is set to d, then the copper sheets rotate once each time the screws generate vertical displacement d; the screw pitch is far shorter than the vertical displacement of the screws, and the small vertical displacement of the screws can cause the copper sheets to rotate at a large angle; an eddy current damping force formed by the rotation of the copper sheets forms a large torque to the rotating shafts; the torque is converted into a large damping force that impedes the vertical movement of the screws through screw pairs; the larger the ratio of the screw displacement and the screw pitch is, the better the amplification effect is; and thus, the damper obtains a large damping coefficient.

In the coupling beam eddy current damper with shear displacement amplification of the present invention, the vertical relative shear displacement of the coupling beams is converted into the rotation of the circular copper sheets to generate the eddy current for energy dissipation; the shear displacement of the coupling beams is amplified by the levers and thread drive; and small shear displacement can cause large angle rotation of the copper sheets, thereby greatly increasing the energy dissipation efficiency.

In the coupling beam eddy current damper with shear displacement amplification of the present invention, the damping parameter can be adjusted by adjusting a lever ratio, the magnetic field strength of the permanent magnets, the thickness of the copper sheets, the radius of the copper sheets, and the distance between the copper sheets and the permanent magnets.

In the coupling beam eddy current damper with shear displacement amplification of the present invention, the permanent magnets are adopted for providing continuous magnetic field sources, and long-term stable vibration reduction effect can be generated without outside energy.

The coupling beam eddy current damper with shear displacement amplification of the present invention adopts magnetic conductive materials, which can effectively avoid magnetic leakage in magnetic circuits, so that the efficiency of eddy current damping is increased, and the influence on various components and parts around is avoided.

The coupling beam eddy current damper with shear displacement amplification of the present invention has reasonable design, simple structure and convenient installation method.

In the present invention, the relative vertical displacement on both sides of the coupling beams can be amplified. The magnification is $R_1/R_2$. The larger the ratio of $R_1$ and $R_2$ is, the more obvious the amplification effect is and the higher the energy dissipation efficiency is.

If the screw pitch of the screws in the present invention is set to d, then the copper sheets will rotate a circle when the screws generate vertical displacement d; the screw pitch is much smaller than the vertical displacement of the screws, and the small vertical displacement of the screws can cause the copper sheets to rotate at a large angle; an eddy current damping force formed by the rotation of the copper sheets forms a large torque to the rotating shafts; the torque is converted into a large damping force that impedes the vertical movement of the screws through screw pairs; the larger the ratio of the screw displacement and the screw pitch is, the better the amplification effect is; and thus, the damper obtains a large damping coefficient.

The invention claimed is:

1. A coupling beam eddy current damper with shear displacement amplification, the damper comprising a rigid rod (1), rotating shafts (2), a pin column (3), pins (4), levers (5), screws (6), thread sleeves (7), copper sheets (8), permanent magnet components (9), a steel structural component (10), balls (11), ball supports (12) and an outer shell (13), wherein the outer shell (13) is of a hollow rectangular structure with an open end; the steel structural component (10) is of a rectangular structure with a through hole in the middle; four spatial structures for installing the permanent magnet components (9) are constructed through a plurality of steel plates in the steel structural component (10); the steel structural component (10) is inserted into the outer shell (13) with a gap therebetween to allow relative movement; the steel structural component (10) and the outer shell (13) are respectively installed on two coupling beams;

a section of the rigid rod (1) is rectangular; the rigid rod (1) is installed on an inner wall surface of the outer shell (13) through the through hole of the steel structural component (10); the rigid rod (1) is rigidly connected to the outer shell (13); a long edge direction of the rigid rod (1) is a vertical direction; two levers (5) are arranged, wherein one end part of each lever (5) is provided with a sliding hole A(501), and the other end part of each lever (5) is provided with a screw mounting hole (502); the middle of each lever (5) is provided with a sliding hole B(503); the pin column (3) penetrates through the sliding hole A(501) of each lever (5) to install the two levers (5) on both sides of the rigid rod (1); and two rotating shafts (2) in the steel structural component (10) respectively penetrate through the sliding holes B(503) of the two levers (5);

four ball supports (12) are arranged, and respectively installed on the outer surface of the inner steel plate of the steel structural component (10); two screws (6) are arranged, and vertically installed in the screw mounting holes (502) through the pins (4); both ends of each screw (6) penetrate through the ball supports (12) and the inner steel plate of the steel structural component (10) in sequence; four thread sleeves (7) are arranged, and closed ends thereof penetrate through the inner steel plate of the steel structural component (10) and are positioned on the outer shell of the steel structural component (10); the four thread sleeves (7) are respectively installed at the ends of the screws (6) through thread pairs; a plurality of balls (11) are installed at the closed ends and open ends of the thread sleeves (7); the balls (11) at the closed ends are in contact with the inner surface of the outer shell of the steel structural component (10), and the balls (11) at the open ends are limited around the screws (6) by the ball supports (12); the thread sleeves (7) can rotate freely between the steel structural component (10) and the ball supports (12); four copper sheets (8) are arranged, and respectively installed on the outer sides of the thread sleeves (7); the copper sheets (8) are perpendicular to the axes of the thread sleeves (7); four groups of permanent magnet components (9) are arranged, and respectively installed in a space formed by the inner steel plate of the steel structural component (10); each group of permanent magnet component (9) has two permanent magnets which are respectively positioned on both sides of the copper sheets (8); and magnetic induction lines among the permanent magnet components (9) are perpendicular to the copper sheets (8).

2. The coupling beam eddy current damper with shear displacement amplification according to claim 1, wherein a distance between the centers of the screw mounting holes (502) and the centers of the sliding holes B(503) is $R_1$, a distance between the centers of the sliding holes A(501) and the centers of the sliding holes B(503) is $R_2$, and $R_1 > R_2$.

* * * * *